Oct. 11, 1932.  L. R. HILGENBERG  1,882,360
TOP FOR VEHICLES
Filed Oct. 10, 1930  2 Sheets-Sheet 1
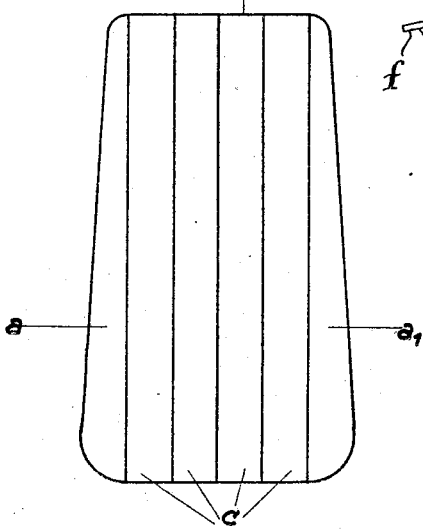
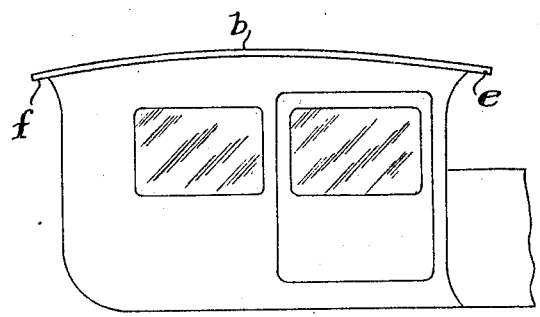
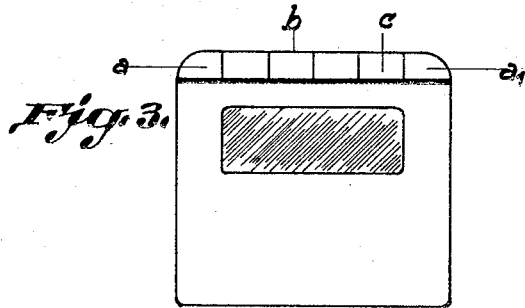
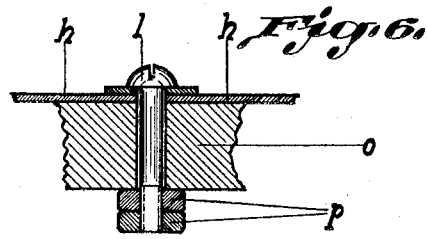
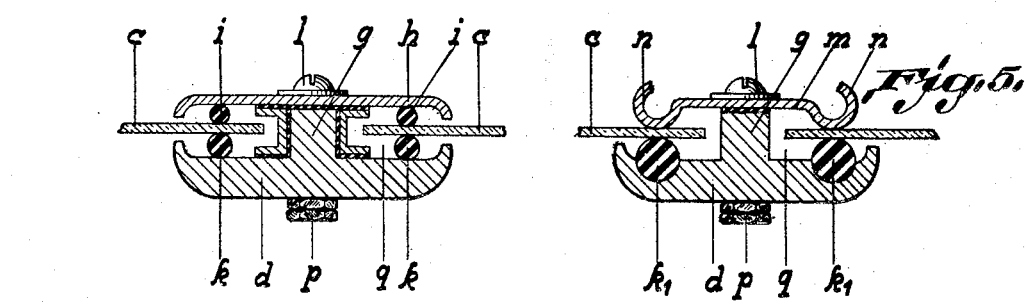

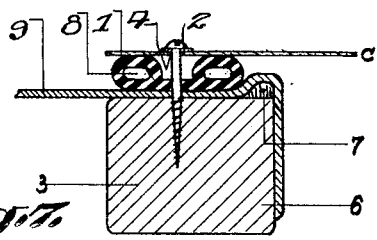
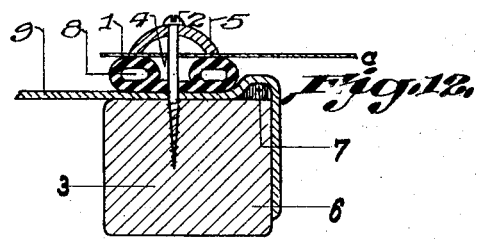
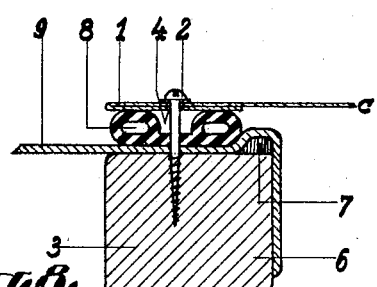
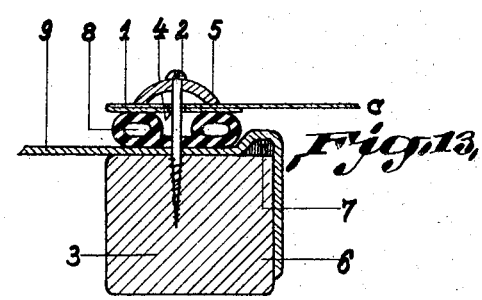
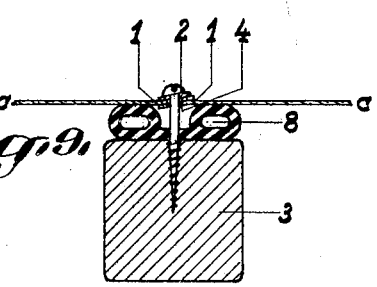
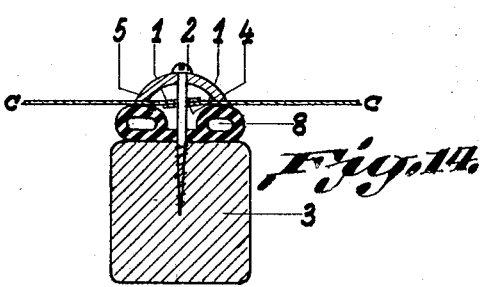
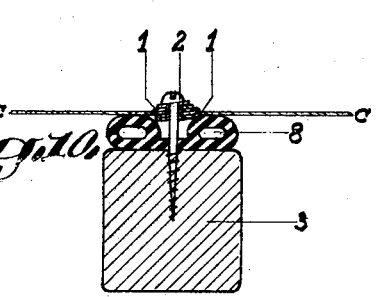
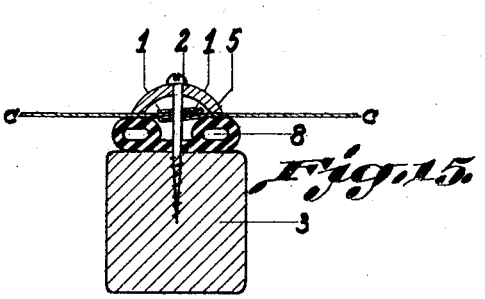
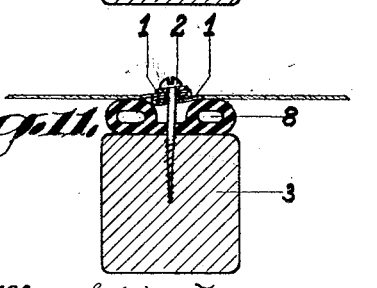
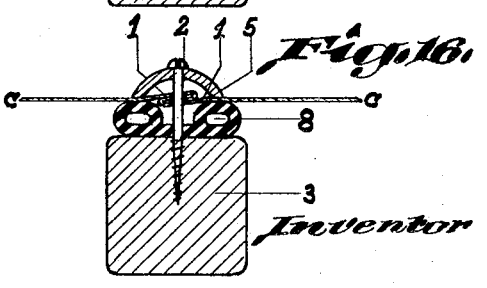

Patented Oct. 11, 1932

1,882,360

UNITED STATES PATENT OFFICE

LUDWIG ROBERT HILGENBERG, OF LEIPZIG-MARIENHOHE, GERMANY

TOP FOR VEHICLES

Application filed October 10, 1930, Serial No. 487,741, and in Germany October 12, 1929.

The present invention relates to tops or covers of vehicles, and especially motor vehicles, consisting of sheets of transparent material.

It is known to the art to produce tops for vehicles, and especially motor vehicles, from glass or other transparent materials to permit occupants a better view of the outside, particularly when looking up. The known types of these tops suffer, however, from the drawback that they are not absolutely tight, owing to the constant shocks and vibrations to which the vehicle is exposed, and rain and dust can easily enter the vehicle after a short time. Moreover, the broad laths serving as supports interfere considerably with a free outlook.

The invention eliminates these drawbacks by forming the top from a plurality of narrow sheets extending longitudinally, transversely or obliquely over the entire length of the vehicle and being arranged so as to project unbound on the narrow sides over the car body or lie on a portion of the latter.

By way of example, one form of the invention is illustrated in the accompanying drawings, in which Figure 1 is a top view of a car top; Fig. 2, a longitudinal view thereof; Fig. 3, a front view thereof; Figs. 4, 5 and 6 are detail views of the connection of the sheets; Figs. 7 to 11 are five different detail views of the connection without covering lath; Figs. 12 to 16, detail views of the connection with covering lath; Figs. 7 and 12, views of an edge portion where the object of the invention is connected with the rest of the roof; Figs. 8 and 13, similar views as Figs. 7 and 12 but with the edge of the sheet turned over; Figs. 9 and 14, views of a joint between two sheets; Figs. 10 and 15, similar views as those shown by Figs. 9 and 14 but with turned over edges; and Figs. 11 and 16, similar views but with interfolded edges.

Referring to the drawings, the two outer longitudinal strips $a$, $a1$ of the top $b$ may consist of sheet metal and disclose the usual semi-circular section (Fig. 3) tapering towards the front. Between the two sheet metal strips $a$, $a1$ narrow strips $c$ consisting of transparent material are arranged longitudinally, though they can be disposed also transversely or obliquely, and rest with their lateral edges on the supporting laths $d$.

The laths $d$ may consist of wood, metal, light metal or the like. The ends of the sheets or strips $c$ project beyond the front and rear body walls $e$ and $f$ or may rest on a member forming part of the roof and shut off the opening in the roof. The supporting laths $d$ extending in the longitudinal direction of the top $b$, which may be reinforced by transverse bars (not shown) if necessary, are made so as to form two grooves $q$ connected by a central web $g$ and covered on top by a bar $h$, which may be elastic and which has the same width as the laths $d$, the longitudinal edges of the bar $h$ being bent inwardly. The sheets $c$ are inserted on both sides between the upwardly extending longitudinal edges of the laths $d$ and the downwardly bent longitudinal edges of the covering bars $h$ by passing between rubber packing cords $i$, $k$, preferably without touching the edges of the laths $d$ and especially of the covering bars $h$. The rubber cords $i$, $k$ prevent water striking the sheets $c$ from entering the inside of the vehicle; even if water should happen to pass the upper packing $i$ and reach the supporting laths $d$, it will run off to both ends of the grooves $q$. The laths $d$ and the covering bars $h$ are held together by means of the screws $l$ passing through the web $g$ in spaced relation to one another, the opposite halves of the supporting laths $d$ and the covering bar $h$ having a clamping effect upon the sheets $c$ which, though elastically fixed between the rubber cords $i$, $k$, are still capable of lateral motion. Water accumulating in the grooves $q$ of the supporting laths $d$ can flow out and over the body walls without any impediment.

A further modification of the packing of the sheets $c$ is shown in Fig. 5 where only one packing member $k1$ is used and the other packing member is replaced by a bridge portion $m$ which yields towards both sides and presses against the inserted sheets $c$. To provide the roll-edges $n$ of the bridge $m$ with an abutment in the rubber packings $k1$, the latter are embedded in grooves in the laths $d$.

To prevent unauthorized removal of the top, the covering bars $h$ are held to the supporting laths $d$ in the usual way by means of the screws $l$, the nuts $p$ of which are inside the vehicle and cannot be reached from outside.

According to Figs. 7 and 12, the edge 1 of the sheets $c$ may have the holes 4 through which the pins 2 pass which are firmly arranged in the supporting lath $d$, the pins 2 passing preferably to holes 4 positioned on the long sides of the sheets $c$ and connecting the latter thereby firmly with the supporting laths 3.

In Figs. 8 and 13 the edges 1 of the sheets $c$ are doubled by being turned over to increase the grip of the pins 2 on the sheets $c$.

According to Figs. 7, 8, 12, and 13, the supporting lath 3 is reinforced on its inner edge by the formation of a roll 7 over and beyond which the roof covering 9 is placed so that moisture penetrating from without and below the elastic support cannot reach the inside of the vehicle and is laterally discharged like the moisture accumulating under the covering bar.

The roof covering 9 is preferably drawn also over the roll 7 on the supporting lath 3 and thus employed as packing means at that point.

The roll 7 is placed also outside so as to cover also for a distance the connecting roof parts.

Figs. 9 and 14 show how the long sides 1 of the two abutting sheets $c$ are secured to their common lath 3 by the pins 2, or screws and the like, the edge portions 1 of the sheets $c$ or the rows of perforations arranged thereon being made to register and are then connected with their supporting lath 3 by the pins 2.

As Figs. 10 and 15 indicate, the ends of the sheets $c$ may be reinforced by folding, while in Figs. 11 and 16 doubling of the ends takes the form of interfolding, which is preferable if flexible material is used.

As stated before, the sheets may be secured to their supporting lath 3 without the covering bars 5, according to the arrangement shown in Figs. 7 to 11.

According to Figs. 11 to 16, the covering bars 5 may be used also, which affords the advantage that the pins 2 can serve now for securing both the covering bar 5 and the sheets $c$.

The pins 2 may of course be employed so that a few of them hold both the covering bar 5 and the sheets $c$ while others lying under the covering bar 5 and being therefore covered by it hold only the sheets $c$ in position, which are thus pressed on to the elastic support and held in position by the pins 2 and the covering bar 5.

The heads of the pins 2 or the screws and the like may be specially packed relative to the sheets $c$ by supports of elastic material, such as rubber discs and the like. The head of the pin and the like may further be fully shut off from the outside by a small rubber cap.

I claim:—

1. A top for vehicles comprising a plurality of transparent strips extending in the same direction over the vehicle body, supports disposed between every two of the said transparent strips, the said supports being firmly secured to the vehicle body, and elastic holding members arranged on the said supports for yieldingly holding between them the longitudinal edges of the said transparent strips.

2. A top for vehicles comprising a plurality of transparent strips extending in the same direction over the vehicle body, supports disposed every two of the said transparent strips, the said supports being firmly secured to the vehicle body and consisting of an upper and lower part, the lower part of the said supports serving as drain for water and moisture, and elastic holding members arranged between the upper and lower part of the said supports for yieldingly holding between them the longitudinal edges of the said transparent strips.

3. A top for vehicles according to claim 1, in which the transparent strips are longer than the vehicle body.

In testimony whereof I have affixed my signature.

LUDWIG ROBERT HILGENBERG.